(12) United States Patent
Li et al.

(10) Patent No.: US 11,949,119 B2
(45) Date of Patent: Apr. 2, 2024

(54) COVER ASSEMBLY OF SECONDARY BATTERY AND SECONDARY BATTERY

(71) Applicant: CONTEMPORARY AMPEREX TECHNOLOGY CO., LIMITED, Ningde (CN)

(72) Inventors: Quankun Li, Ningde (CN); Shiyao Zhang, Ningde (CN); Peng Wang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 190 days.

(21) Appl. No.: 16/928,523

(22) Filed: Jul. 14, 2020

(65) Prior Publication Data

US 2021/0043901 A1  Feb. 11, 2021

(30) Foreign Application Priority Data

Aug. 8, 2019  (CN) .......................... 201910729374.X (51) Int. Cl.
| | | |
|---|---|---|
| *H01M 50/325* | (2021.01) | |
| *H01M 50/147* | (2021.01) | |
| *H01M 50/155* | (2021.01) | |
| *H01M 50/183* | (2021.01) | |
| *H01M 50/184* | (2021.01) | |
| *H01M 50/30* | (2021.01) | |

(Continued)

(52) U.S. Cl.
CPC ....... *H01M 50/325* (2021.01); *H01M 50/147* (2021.01); *H01M 50/155* (2021.01); *H01M 50/183* (2021.01); *H01M 50/184* (2021.01); *H01M 50/358* (2021.01); *H01M 50/383* (2021.01); *H01M 50/394* (2021.01)

(58) Field of Classification Search
CPC ............. H01M 50/325; H01M 50/394; H01M 50/183; H01M 50/383
See application file for complete search history.

(56) References Cited

U.S. PATENT DOCUMENTS

| | | | | |
|---|---|---|---|---|
| 5,712,056 A | * | 1/1998 | Matsumasa | ......... H01M 50/325 220/203.11 |
| 2010/0099014 A1 | * | 4/2010 | Zheng | ................. H01M 50/325 137/511 |

(Continued)

FOREIGN PATENT DOCUMENTS

| | | |
|---|---|---|
| CN | 1747198 A | 3/2006 |
| CN | 2904308 A | 5/2007 |

(Continued)

OTHER PUBLICATIONS

Machine Translation of: JP 2007-220508A, Yoshida, Aug. 30, 2007.*

(Continued)

*Primary Examiner* — Kenneth J Douyette
(74) *Attorney, Agent, or Firm* — East IP P.C.

(57) ABSTRACT

A cover assembly of a secondary battery and a secondary battery. The cover assembly includes: a cover plate including a gas vent; a gas exhaust valve configured to seal the gas vent and deform in response to an increase in temperature to get out of a state of sealing the gas vent; and a protective part at least partially covering the gas vent and having a gas permeability coefficient smaller than a gas permeability coefficient of the gas exhaust valve.

14 Claims, 10 Drawing Sheets

(51) Int. Cl.
*H01M 50/358* (2021.01)
*H01M 50/383* (2021.01)

(56) References Cited

U.S. PATENT DOCUMENTS

| | | | | |
|---|---|---|---|---|
| 2011/0174556 A1* | 7/2011 | Hermann | ................ | B60L 50/64 |
| | | | | 429/62 |
| 2011/0200856 A1 | 8/2011 | Yasui | | |
| 2012/0015219 A1* | 1/2012 | Wang | ................ | H01M 50/3425 |
| | | | | 429/53 |
| 2014/0315050 A1 | 10/2014 | Li et al. | | |
| 2015/0024241 A1* | 1/2015 | Kim | .................... | H01M 50/169 |
| | | | | 429/56 |
| 2015/0236333 A1* | 8/2015 | Guen | .................... | H01M 10/42 |
| | | | | 429/61 |
| 2019/0214619 A1* | 7/2019 | Li | .................... | H01M 10/0525 |

FOREIGN PATENT DOCUMENTS

| | | | |
|---|---|---|---|
| CN | 201226363 Y | | 4/2009 |
| CN | 201307612 Y | | 9/2009 |
| CN | 101894932 A | | 11/2010 |
| CN | 102074672 A | | 5/2011 |
| CN | 105206773 A | | 12/2015 |
| CN | 105405991 A | | 3/2016 |
| CN | 105405992 A | | 3/2016 |
| CN | 106848145 A | | 6/2017 |
| CN | 107112473 A | | 8/2017 |
| CN | 206610837 U | | 11/2017 |
| CN | 108717963 A | | 10/2018 |
| CN | 208225973 U | | 12/2018 |
| CN | 109817853 A | | 5/2019 |
| CN | 208986031 U | | 6/2019 |
| CN | 110391367 A | | 10/2019 |
| JP | 2004055372 A | | 2/2004 |
| JP | 2007220508 A | * | 8/2007 |
| JP | 2007220508 A | | 8/2007 |
| JP | 2016126989 A | | 7/2016 |
| KR | 20060042820 A | | 5/2006 |

OTHER PUBLICATIONS

European Search Report from corresponding European Application No. 19213816, dated Dec. 15, 2020, 13 pages.

Chinese Office Action from corresponding Chinese Application No. 201910729374.X, dated Mar. 15, 2021, 15 pages.

International Search Report from corresponding International Application No. PCT/CN2020/102828, dated Oct. 19, 2020, 5 pages with translation.

* cited by examiner

COVER ASSEMBLY OF SECONDARY BATTERY AND SECONDARY BATTERY

CROSS-REFERENCE TO RELATED APPLICATIONS

The present application claims priority to Chinese Patent Application No. 201910729374.X, filed on Aug. 8, 2019, the content of which is incorporated herein by reference in its entirety.

TECHNICAL FIELD

The present disclosure relates to the technical field of energy storage devices, and in particular, to a cover assembly of a secondary battery and a secondary battery.

BACKGROUND

As an important part of a new energy vehicle, a secondary battery is important in its safety performance. With charging and discharging of the secondary battery, gas will be generated inside the secondary battery. If the gas has a high pressure, the secondary battery may explode. Accordingly, a gas pressure-controlled vent may be provided on a cover plate of the secondary battery.

Since one secondary battery has small capacity or small power, a plurality of secondary batteries is usually provided to form a battery module for use. Once one secondary battery of the battery module experiences thermal runaway, heat generated thereby will be quickly transferred to other secondary batteries of the battery module. Accordingly, the other secondary batteries also experience thermal runaway, thereby causing sharp rise in temperature and gas pressure. When the existing gas pressure-controlled vent experiences thermal runaway, there is a risk that the secondary battery will explode if there is no enough time to release the pressure.

Therefore, it is needed to design a new secondary battery to solve the above problems, so as to improve the safety performance of the secondary battery.

SUMMARY

The present disclosure provides a cover assembly of a secondary battery and a secondary battery that can solve the problem in the related art and improve a safety performance of the secondary battery.

In a first aspect, the present disclosure provides a cover assembly of a secondary battery, including:
a cover plate including a gas vent;
a gas exhaust valve configured to seal the gas vent and deform in response to an increase in temperature to get out of a state of sealing the gas vent; and
a protective part at least partially covering the gas vent and having a gas permeability coefficient that is smaller than a gas permeability coefficient of the gas exhaust valve.

In a possible design, the gas exhaust valve has a melting point within a range of 80° C. to 200° C., and the protective part is a metal sheet.

In a possible design, the protective part is arranged at one side of the gas exhaust valve.

In a possible design, the protective part is attached to a surface of the gas exhaust valve facing away from the gas vent and completely covers the gas vent.

In a possible design, the cover assembly further includes a pressing block, and the pressing block is provided with a center hole opposite to the gas vent; and
the pressing block is fixed to the cover plate and located at a side of the gas exhaust valve facing away from the gas vent, and the gas exhaust valve is fixed to the cover plate through the pressing block.

In a possible design, the protective part is attached to a surface of the pressing block facing away from the gas vent and completely covers the gas vent.

In a possible design, a projection of the protective part in a thickness direction of the cover assembly is located within a projection of the center hole in the thickness direction of the cover assembly.

In a possible design, a first protrusion is provided on a surface of the cover plate facing the gas exhaust valve, and the first protrusion presses against the gas exhaust valve; and/or
a second protrusion is provided on a surface of the pressing block facing the gas exhaust valve, and the second protrusion presses against the gas exhaust valve.

In a possible design, the protective part is at least partially disposed inside the gas exhaust valve.

In a possible design, the protective part completely covers the gas vent.

In a possible design, the protective part includes a main body, a connection portion, and an extension portion;
the main body is in a form of a flat plate, and the main body completely covers the gas vent;
the connection portion is connected between the main body and the extension portion and is bent with respect to the main body; and
the extension portion extends in a direction facing away from the gas vent.

In a possible design, a first protrusion is provided on a surface of the cover plate facing the gas exhaust valve, and the first protrusion presses against the gas exhaust valve;
a second protrusion is provided on a surface of the pressing block facing the gas exhaust valve, and the second protrusion presses against the gas exhaust valve; and
the first protrusion is located at a side of the connection portion close to the gas vent; and the second protrusion is located at a side of the connection portion facing away from the gas vent.

In a possible design, the cover assembly further includes:
a sealing part surrounding the gas vent;
the sealing part is disposed between the gas exhaust valve and the cover plate for sealing a gap between the gas exhaust valve and the cover plate; or the sealing part is disposed between the protective part and the cover plate for sealing a gap between the protective part and the cover plate.

In a second aspect, the present disclosure provides a secondary battery, including:
a case including an opening;
an electrode assembly received in the case; and
the cover assembly described above, the cover assembly covering the opening of the case.

A technical solution provided by the present disclosure can achieve the following beneficial effects.

In the embodiments provided by the present disclosure, the cover assembly seals the gas vent by the gas exhaust valve, and the gas exhaust valve deforms in response to an increase in temperature in such a manner that the gas exhaust valve no longer seals the gas vent. When temperature inside the case of the secondary battery rises, the gas exhaust valve no longer seals the gas vent, so that the gas inside the case can be exhausted via the gas vent. In this way, on the one hand, the pressure inside the case can be reduced so as to prevent explosion of the secondary battery, and on the other hand, partial heat can be taken away by exhausting gas so as to slow down the thermal runaway of the secondary battery and provide sufficient escape time for passengers.

The protective part at least partially covers the gas vent, and the gas permeability coefficient of the protective part is smaller than the gas permeability coefficient of the gas exhaust valve, thus, moisture or other gas at an exterior of the case can be prevented from entering the case, thereby increasing a service life of the secondary battery.

It should be understood that the foregoing general description and the following detailed description are merely exemplary and are not intended to limit the present disclosure.

DESCRIPTION OF DRAWINGS

In order to more clearly illustrate technical solutions in embodiments of the present disclosure or in the related art, the accompanying drawings used in the embodiments and in the related art are briefly introduced as follows. It should be noted that the drawings described as follows are merely part of the embodiments of the present disclosure, other drawings can also be acquired by those skilled in the art without paying creative efforts.

REFERENCE SIGNS 100-secondary battery;
1-cover assembly;
  11-cover plate;
    111-anti-explosion vent;
    112-gas vent;
    113-first recess;
    114-second recess;
    115-first protrusion;
  12-anti-explosion plate;
  13-gas exhaust valve;
  14-protective part;
    141-main body;
    142-connection portion;
    143-extension portion;
  15-pressing block;
    151-center hole;
    152-second protrusion;
  16-insulation plate;
  17-electrode terminal;
  18-sealing part;
2-case;
3-electrode assembly;
4-connection plate.

The drawings herein are incorporated into and constitute a part of the present specification, illustrate embodiments of the present disclosure and explain principles of the present disclosure together with the specification.

DESCRIPTION OF EMBODIMENTS

The technical solutions in the embodiments of the present disclosure are described in the following with reference to the accompanying drawings. It should be noted that, the described embodiments are merely exemplary embodiments of the present disclosure, which shall not be interpreted as providing limitations to the present disclosure. All other embodiments obtained by those skilled in the art without creative efforts according to the embodiments of the present disclosure are within the scope of the present disclosure.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

It should be understood that the term "and/or" used herein is merely an association relationship describing associated objects, indicating that there may be three relationships, for example, A and/or B may indicate that three cases, i.e., A existing individually, A and B existing simultaneously, B existing individually. In addition, the character "/" herein generally indicates that the related objects before and after the character form an "or" relationship.

It should be understood that, the terms such as "upper", "lower", "left", "right" and the like are used to indicate positions shown in the drawing, instead of being construed as limitations of the embodiment of the present disclosure. In addition, when an element is described as being "on" or "under" another element in the context, it should be understood that the element can be directly or via an intermediate element located "on" or "under" another element.

Figure 1:
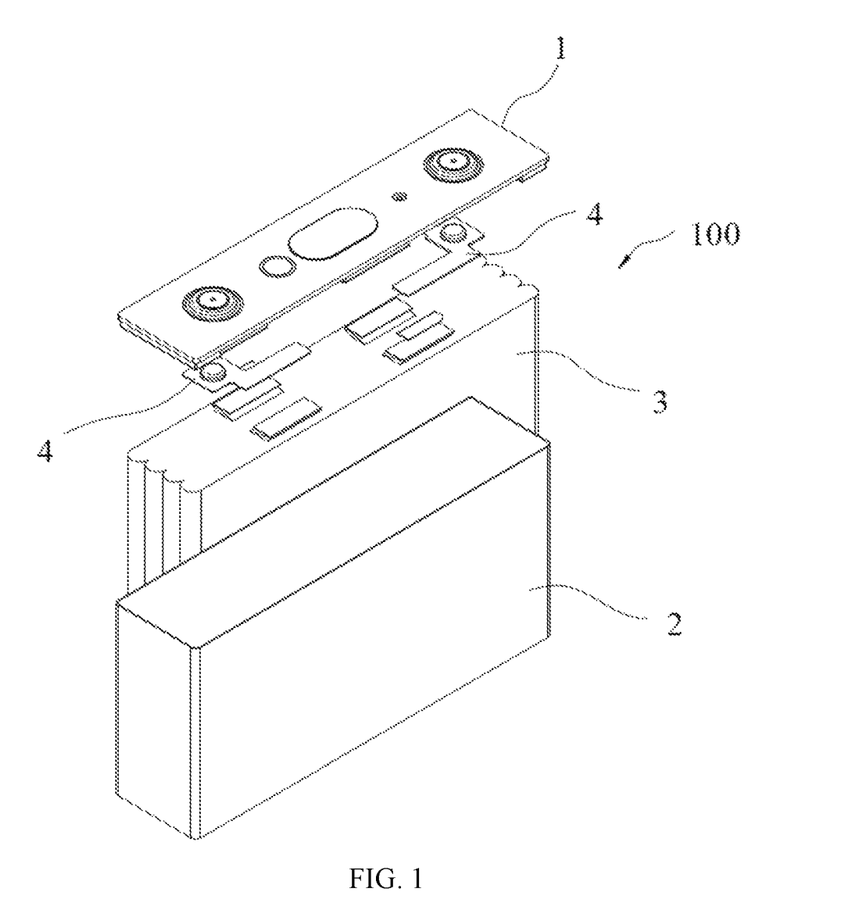
FIG. 1 is a schematic diagram of a structure of a secondary battery according to an embodiment of the present disclosure.
Figure 2:
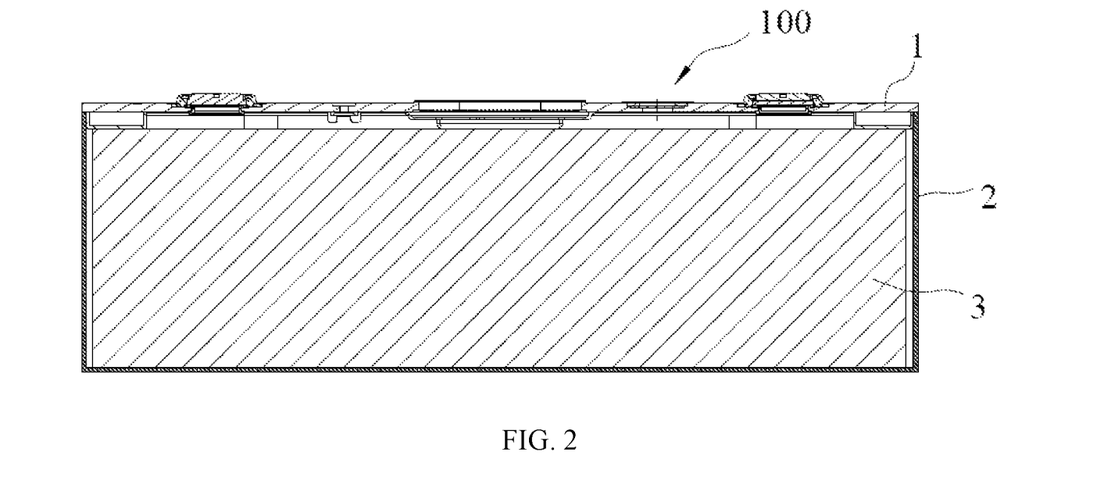
FIG. 2 is a front cross-sectional view illustrating a structure of a secondary battery according to an embodiment of the present disclosure.

FIG. 1 is a schematic diagram of a structure of a secondary battery according to an embodiment of the present disclosure. FIG. 2 is a front cross-sectional view illustrating a structure of a secondary battery according to an embodiment of the present disclosure. As shown in FIG. 1 and FIG. 2, an embodiment of the present disclosure provides a secondary battery 100. The secondary battery 100 includes a case 2, an electrode assembly 3 and a cover assembly 1.

The case 2 may be in a hexahedron shape or other shape. A receiving cavity is formed inside the case 2 for receiving the electrode assembly 3 and an electrolyte. The case 2 is open at its one end, so that the electrode assembly 3 can be placed in the receiving cavity of the case 2 through this opening. A plurality of electrode assemblies 3 may be arranged in the receiving cavity, and the plurality of electrode assemblies 3 is stacked with respect to each other. The case 2 may be made of a metal material such as aluminum or aluminum alloy, or may be made of an insulation material such as plastic.

The electrode assembly 3 includes an electrode unit and tab. The electrode unit includes a negative electrode, a positive electrode, and a separator. The separator is located between a negative electrode and a positive electrode that are adjacent, so as to separate the negative electrode from the positive electrode.

In one embodiment, the negative electrode, the separator, and the positive electrode are sequentially stacked and wound to form the electrode unit of the electrode assembly 3. That is, the electrode unit has a wound structure. In another embodiment, the negative electrode, the separator, and the positive electrode are sequentially stacked to form the electrode unit of the electrode assembly 3, and this electrode unit has a stacked structure. The electrode unit includes a slit after being formed, and the electrolyte can enter the electrode unit via the slit to infiltrate the negative electrode and the positive electrode.

The negative electrode includes a negative current collector (for example, a copper foil) and a negative active material layer (for example, carbon or silicon) coated on a surface of the negative current collector. The positive electrode includes a positive current collector (for example, an aluminum foil) and a positive active material layer (for example, a ternary material, lithium iron phosphate or lithium cobaltate) coated on a surface of the positive current collector. A negative electrode tab is connected to the negative electrode and protrudes from the electrode unit. The negative electrode tab may be formed by directly cutting the negative current collector. A positive electrode tab is connected to the positive electrode and protrudes from the electrode unit. The positive electrode tab may be formed by directly cutting the positive current collector.

Figure 3:
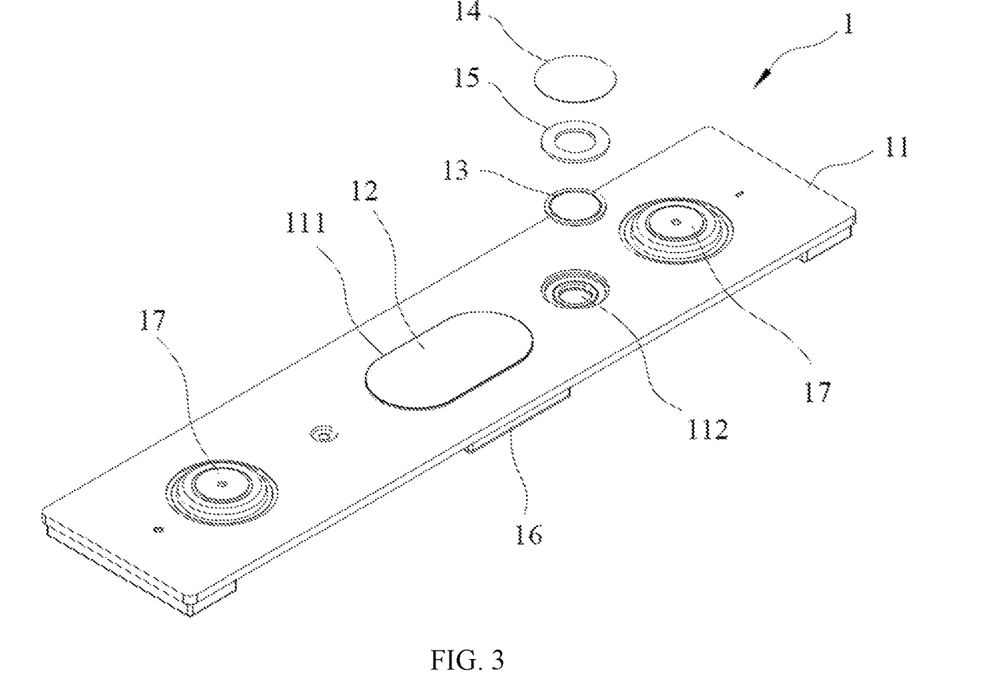
FIG. 3 is an exploded view of a structure of a cover assembly of a secondary battery according to an embodiment of the present disclosure.

FIG. 3 is an exploded view of a structure of a cover assembly 1 of a secondary battery 100 according to an embodiment of the present disclosure. As shown in FIG. 1 to FIG. 3, the cover assembly 1 includes a cover plate 11 and electrode terminals 17. The cover plate 11 is fixed to the opening of the case 2, thereby making the electrode assembly 3 and the electrolyte be enclosed in the receiving cavity of the case 2. The electrode terminals 17 are arranged at the cover plate 11 and include a negative electrode terminal 17 and a positive electrode terminal 17. The two electrode terminals 17 are electrically connected to respective tabs via connection plates 4. The cover plate 11 is provided with an anti-explosion vent 111, and the anti-explosion plate 12 covers the anti-explosion vent 111.

Specifically, for the secondary battery 100 in which the tabs protrude from a top of the electrode unit, the above-mentioned connection plates 4 are located between the electrode unit of the electrode assembly 3 and the cover plate 11. The connection plates 4 include a negative connection plate 4 and a positive connection plate 4. The negative connection plate 4 is configured to connect the negative electrode tab with the negative electrode terminal 17, and the positive connection plate 4 is configured to connect the positive electrode with the positive electrode terminal 17. The cover assembly 1 further includes an insulation plate 16 that insulates the cover plate 11 from the electrode assembly 3.

The plurality of secondary batteries 100 described above can form a battery module. In the battery module, if one secondary battery 100 experiences thermal runaway, the generated heat will be transferred to an adjacent secondary battery 100, thereby causing thermal runaway of the nearby secondary battery 100.

Figure 4:
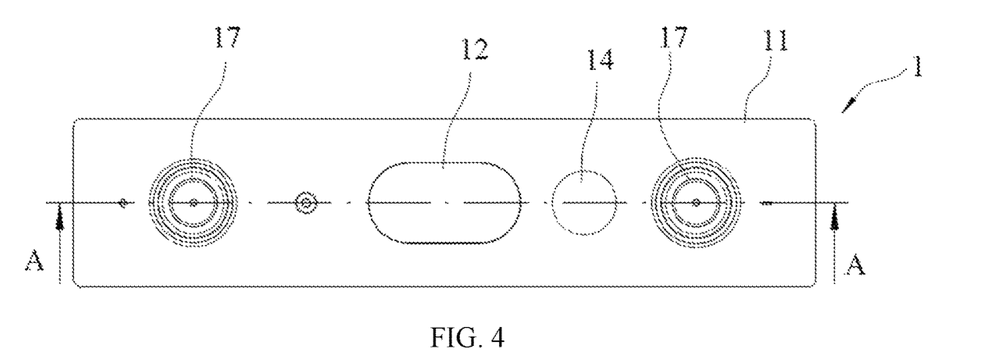
FIG. 4 is a front view of a cover assembly of a secondary battery according to an embodiment of the present disclosure.
Figure 5:
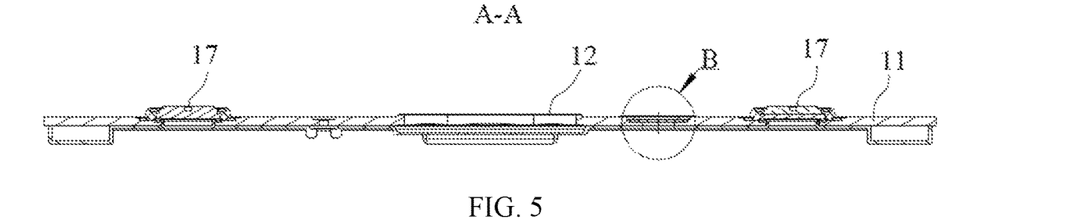
FIG. 5 is a cross-sectional view taken along line A-A of FIG. 4.
Figure 6:
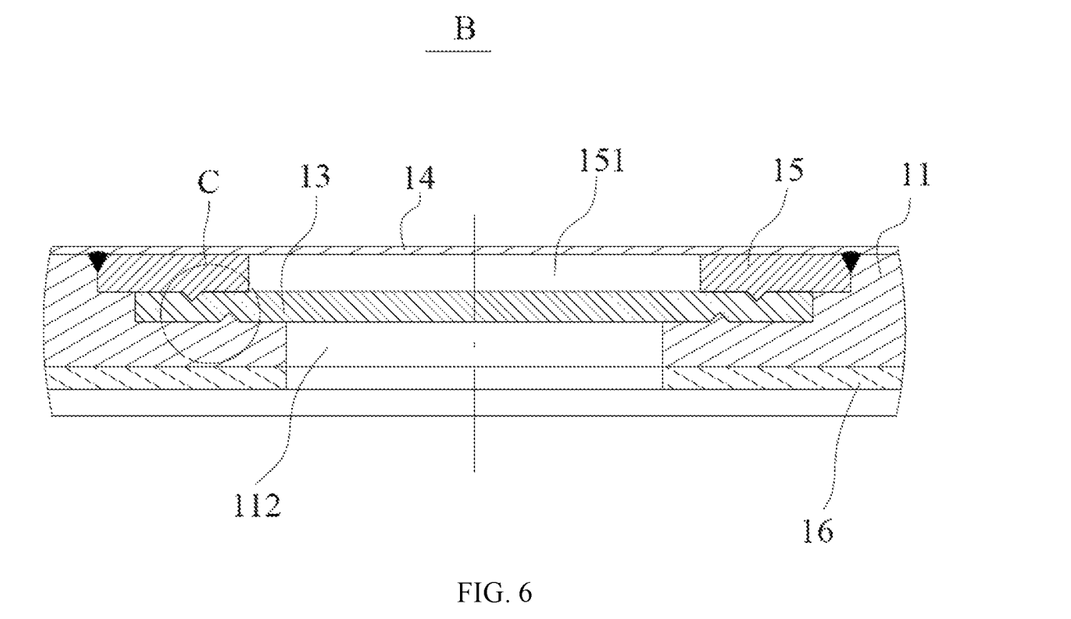
FIG. 6 is an enlarged view of an area B of FIG. 5.
Figure 7:
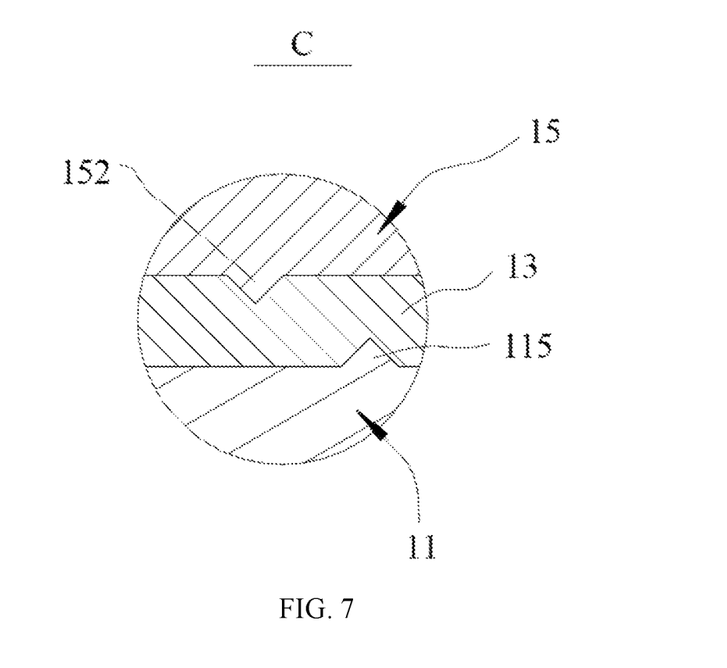
FIG. 7 is an enlarged view of an area C of FIG. 6.
Figure 8:
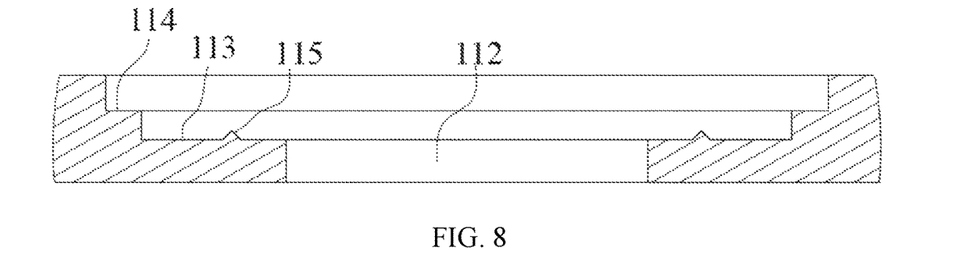
FIG. 8 is a cross-sectional view of a portion of a cover plate of FIG. 6.

In order to solve this problem, an embodiment of the present disclosure provides a cover assembly 1 of a secondary battery 100. FIG. 4 is a front view of the cover assembly 1 of the secondary battery 100 according to an embodiment of the present disclosure. FIG. 5 is a cross-sectional view taken along line A-A of FIG. 4. FIG. 6 is an enlarged view of an area B of FIG. 5. FIG. 7 is an enlarged view of an area C of FIG. 6. FIG. 8 is a cross-sectional view of a portion of a cover plate 11 of FIG. 6;

As shown in FIG. 3 to FIG. 8, the cover assembly 1 includes a cover plate 11, a gas exhaust valve 13, and a protective part 14.

The cover plate 11 includes a gas vent 112. The gas exhaust valve 13 seals the gas vent 112, and the gas exhaust valve 13 deforms in response to an increase in temperature in such a manner that the gas exhaust valve 13 no longer seals the gas vent 112. The protective part 14 at least partially covers the gas vent 112, and a gas permeability coefficient of the protective part 14 is smaller than a gas permeability coefficient of the gas exhaust valve 13.

In this embodiment, the cover assembly 1 seals the gas vent 112 by the gas exhaust valve 13, and the gas exhaust valve 13 deforms in response to an increase in temperature in such a manner that the gas exhaust valve 13 no longer seals the gas vent 112. When temperature inside the case 2 of the secondary battery 100 rises, the gas exhaust valve13 no longer seals the gas vent 112, so that the gas inside the case 2 can be exhausted via the gas vent 112. In this way, on the one hand, the pressure inside the case 2 can be reduced so as to prevent explosion of the secondary battery 100, and on the other hand, partial heat can be taken away by exhausting gas so as to slow down the thermal runaway of the secondary battery 100 and provide sufficient escape time for passengers.

Since the protective part 14 at least partially covers the gas vent 112, and the gas permeability coefficient of the protective part 14 is smaller than the gas permeability coefficient of the gas exhaust valve 13, moisture or other gas outside the case 2 can be prevented from penetrating into the case 2, thereby increasing a service life of the secondary battery 100.

The gas permeability coefficient described above refers to a volume of gas passing through a sample per unit thickness, per unit area and per unit time under a constant temperature per unit pressure difference, and is in a unit of $cm^3/cm^2 \cdot s \cdot Pa \cdot cm$. It can be seen that the smaller the gas permeability coefficient is, the better the airtightness is.

In an implementation, the gas exhaust valve 13 has a lower melting point than the cover plate 11. For example, the gas exhaust valve 13 may be made of PP (polypropylene), PE (polyethylene) or the like. When the temperature inside the case 2 exceeds the melting point of the gas exhaust valve 13, the gas exhaust valve 13 will deform, that is, melting or softening occurs. At this time, the gas exhaust valve 13 will get out of a state of sealing the gas vent 112, so that the gas vent 112 is opened and thus the gas inside the case 2 of the secondary battery 100 can be exhausted to an exterior of the case 2 via the gas vent 112.

In an implementation, the melting point of the gas exhaust valve 13 is within a range of 80° C. to 200° C., and the protective part 14 is a metal sheet. The protective part 14 made of a metal material can not only prevent moisture or other gas at the exterior of the case 2 from entering the case 2, but also prevent electrolyte inside the case 2 of the secondary battery 100 from escaping to the exterior of the case 2, thereby increasing the service life of the secondary battery 100.

The metal sheet described above may be an aluminum plate, a stainless steel plate or a nickel plate, preferably an aluminum plate, which has advantages of light weight and excellent anti-penetration performance. In this embodiment, the metal sheet may be made of an aluminum foil that has a light weight. When the gas exhaust valve 13 deforms or is softened, the gas inside the case 2 can blow the aluminum foil to the exterior of the case 2, thereby releasing the gas and heat inside the case 2 to the greatest extent.

In an implementation, the protective part 14 is arranged at one side of the gas exhaust valve 13.

Specifically, the protective part 14 may be arranged at an upper side or a lower side of the gas exhaust valve 13, and may be fixed by adhesive or the like.

In this embodiment, the protective part 14 is attached to a surface of the gas exhaust valve 13 facing away from the gas vent 112 and completely covers the gas vent 112. Since the protective part 14 completely covers the gas vent 112, penetration resistance with respect to the electrolyte inside the case 2 is further improved.

In an implementation, as shown in FIG. 6, the cover assembly 1 further includes a pressing block 15, and the pressing block 15 has a center hole 151 that is opposite to the gas vent 112. The pressing block 15 is fixed to the cover plate 11 and is located at a side of the gas exhaust valve 13 facing away from the gas vent 112, and the gas exhaust valve 13 is fixed to the cover plate 11 through the pressing block 15.

The pressing block 15 presses against the gas exhaust valve 13, and the pressing block 15 may be welded to the cover plate 11, so that the gas exhaust valve 13 is fixed to the cover plate 11.

As shown in FIG. 7, in an implementation, a first protrusion 115 is provided on a surface of the cover plate 11 facing the gas exhaust valve 13, and the first protrusion 115 presses against the gas exhaust valve 13. A second protrusion 152 is provided at a surface of the pressing block 15 facing the gas exhaust valve 13, and the second protrusion 152 presses against the gas exhaust valve 13. The first protrusion 115 and the second protrusion 152 can be embedded into the gas exhaust valve 13 by providing the first protrusion 115 on the cover plate 11 made of a hard material and providing the second protrusion 152 on the pressing block 15 made of a hard material, thereby improving sealing between the cover plate 11, the gas exhaust valve 13 and the pressing block 15.

In an implementation, as shown in FIG. 6 and FIG. 8, the cover plate 11 includes a first recess 113 and a second recess 114. With reference to figures, along a thickness direction (Z) of the cover assembly 1, the first recess 113 is located above the gas vent 112 and the second recess 114 is located above the first recess 113. An inner diameter of the first recess 113 is larger than a diameter of the gas vent 112, and an inner diameter of the second recess 114 is larger than the inner diameter of the first recess 113. The gas exhaust valve 13 is received in the first recess 113, and the pressing block 15 is received in the second recess 114. In this embodiment, the first protrusion 115 is arranged in the first recess 113.

With the first recess 113 and the second recess 114, a top surface of the pressing block 15 is substantially aligned with a top surface of the cover plate 11, so that the pressing block 15 and the gas exhaust valve 13 do not occupy too much space, thereby increasing an energy density of the secondary battery 100.

As shown in FIG. 6, in this embodiment, the protective part 14 is attached to a surface of the pressing block 15 facing away from the gas vent 112 and completely covers the gas vent 112.

The protective part 14 is attached to the surface of the pressing block 15 facing away from the gas vent 112, the protective part 14 can protect the center hole 151 of the pressing block 15, so as to prevent the electrolyte inside the case 2 from escaping to the exterior of the case 2 through the center hole 151 and also prevent gas or liquid outside the case 2 from entering the case 2 through the center hole 151.

Another exemplary embodiment will be described in the following, in which elements that are the same as those in the above exemplary embodiments will not be further described herein, and only dissimilar elements will be described in detail.

Figure 9:
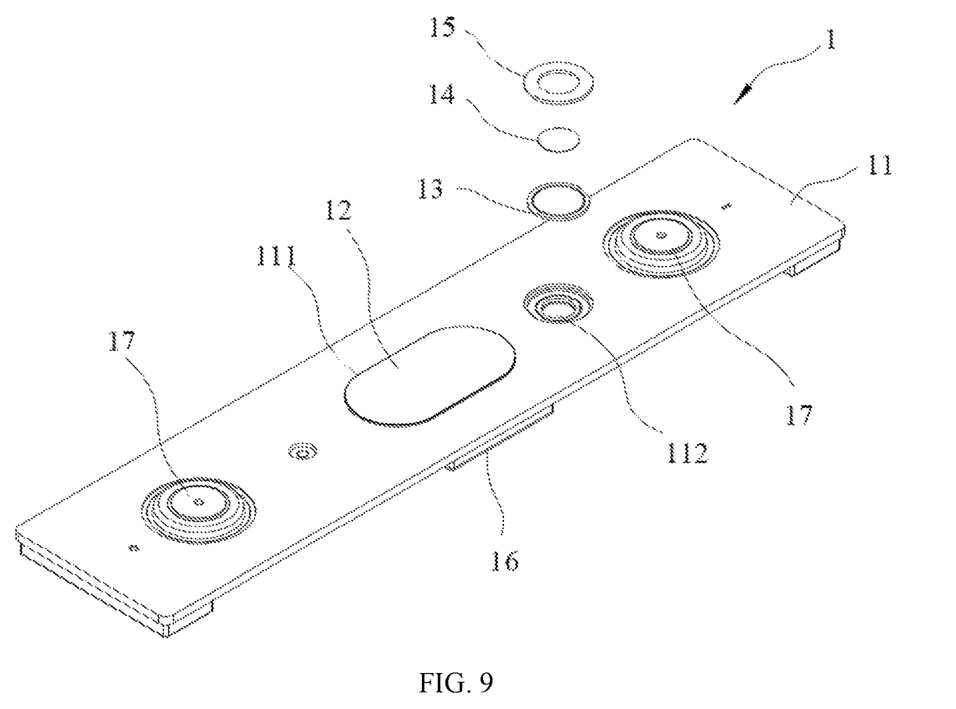
FIG. 9 is an exploded view of a structure of a cover assembly of a secondary battery according to another embodiment of the present disclosure.
Figure 10:
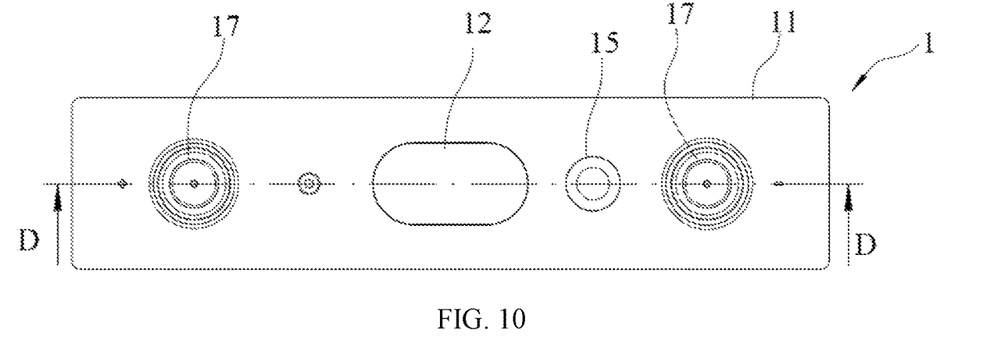
FIG. 10 is a front view of a cover assembly of a secondary battery according to another embodiment of the present disclosure.
Figure 11:
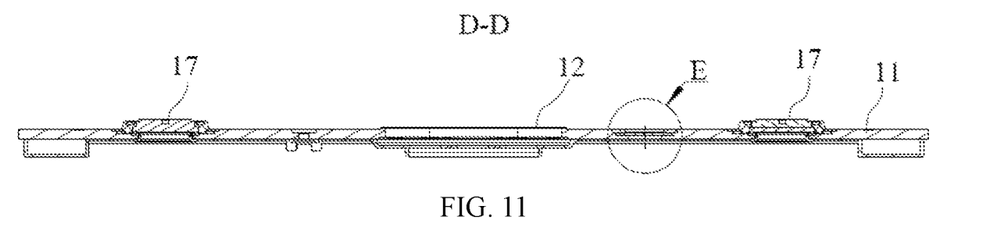
FIG. 11 is a cross-sectional view taken along line D-D of FIG. 10.
Figure 12:
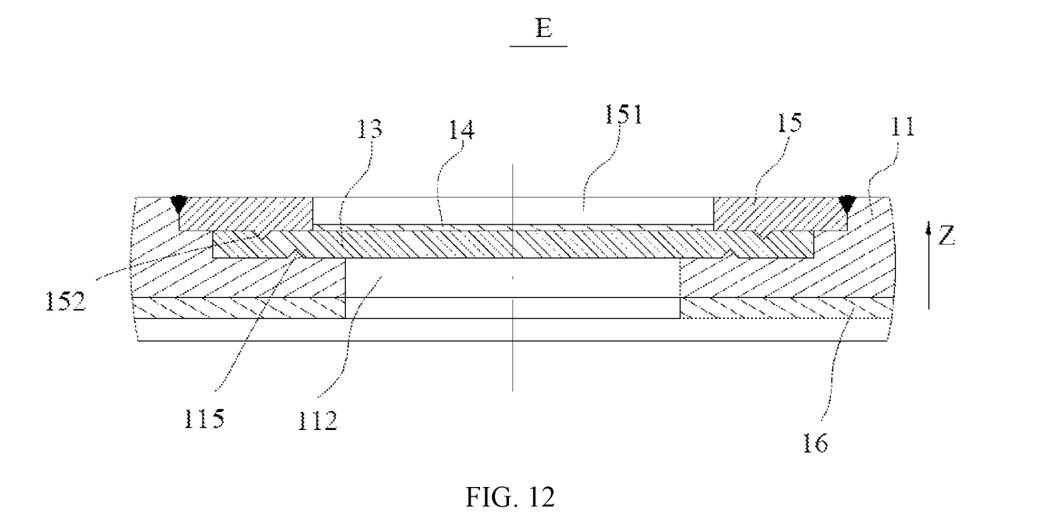
FIG. 12 is an enlarged view of an area E of FIG. 11.

FIG. 9 is an exploded view of a structure of a cover assembly of a secondary battery according to another embodiment of the present disclosure. FIG. 10 is a front view of a cover assembly of a secondary battery according to another embodiment of the present disclosure. FIG. 11 is a cross-sectional view taken along line D-D of FIG. 10. FIG. 12 is an enlarged view of an area E of FIG. 11.

As shown in FIG. 12, in this embodiment, a projection of the protective part 14 along the thickness direction (Z) of the cover assembly 1 is located within a projection of the center hole 151 along the thickness direction (Z) of the cover assembly 1. In an implementation, the protective part 14 is in a form of a disk having an outer diameter smaller than that of the center hole 151, and the protective part 14 may be disposed in the center hole 151. In this way, the protective part 14 does not occupy space in the thickness direction (Z)

of the cover assembly 1, thereby increasing the energy density of the secondary battery 100.

In an implementation, the first protrusion 115 is provided at the surface of the cover plate 11 facing the gas exhaust valve 13, and the first protrusion 115 presses against the gas exhaust valve 13; and/or the second protrusion 152 is provided at the surface of the pressing block 15 facing the gas exhaust valve 13, and the second protrusion 152 presses against the gas exhaust valve 13.

Each of the cover plate 11 and the pressing block 15 is made of a hard material, and the gas exhaust valve 13 is made of a material that is softer than that of the cover plate 11 and the pressing block 1. The first protrusion 115 is provided on the cover plate 11 and the second protrusion 152 is provided on the pressing block 15. When the cover plate 11 and the pressing block 15 press against the gas exhaust valve 13, the first protrusion 115 and the second protrusion 152 can be embedded into the gas exhaust valve 13, thereby improving the sealing property.

Another exemplary embodiment will be described in the following, in which elements that are the same as those in the above exemplary embodiments will not be further described herein, and only dissimilar elements will be described in detail.

Figure 13:
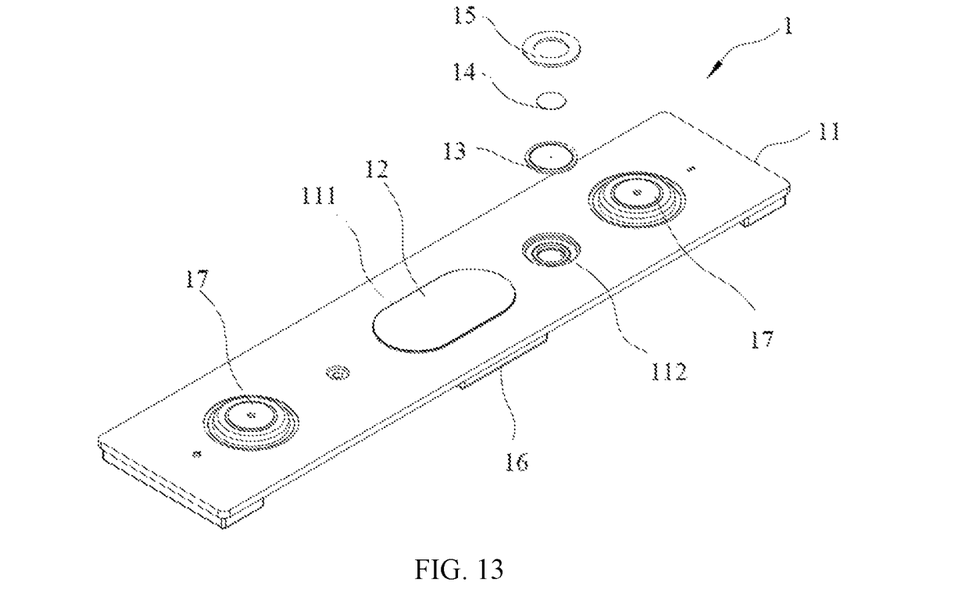
FIG. 13 is an exploded view of a structure of a cover assembly of a secondary battery according to still another embodiment of the present disclosure.
Figure 14:
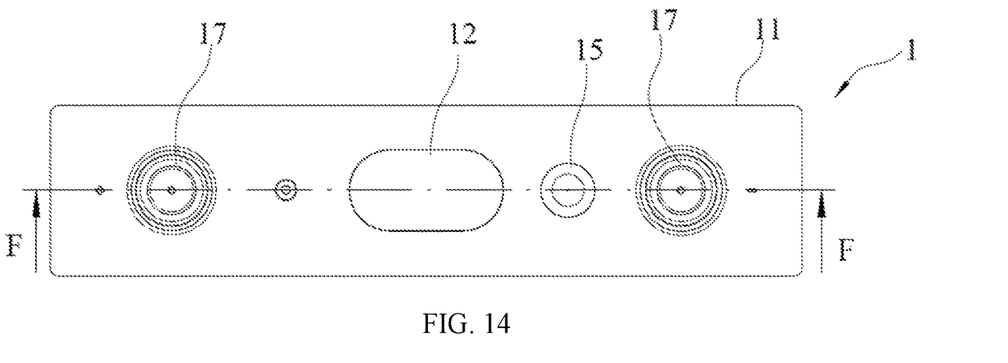
FIG. 14 is a front view of a cover assembly of a secondary battery according to still another embodiment of the present disclosure.
Figure 15:
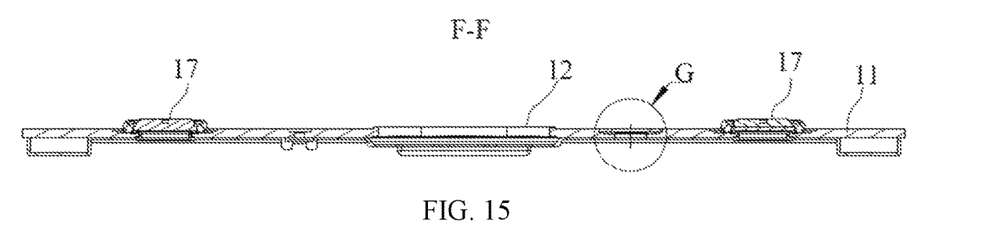
FIG. 15 is a cross-sectional view taken along line F-F of FIG. 14.
Figure 16:
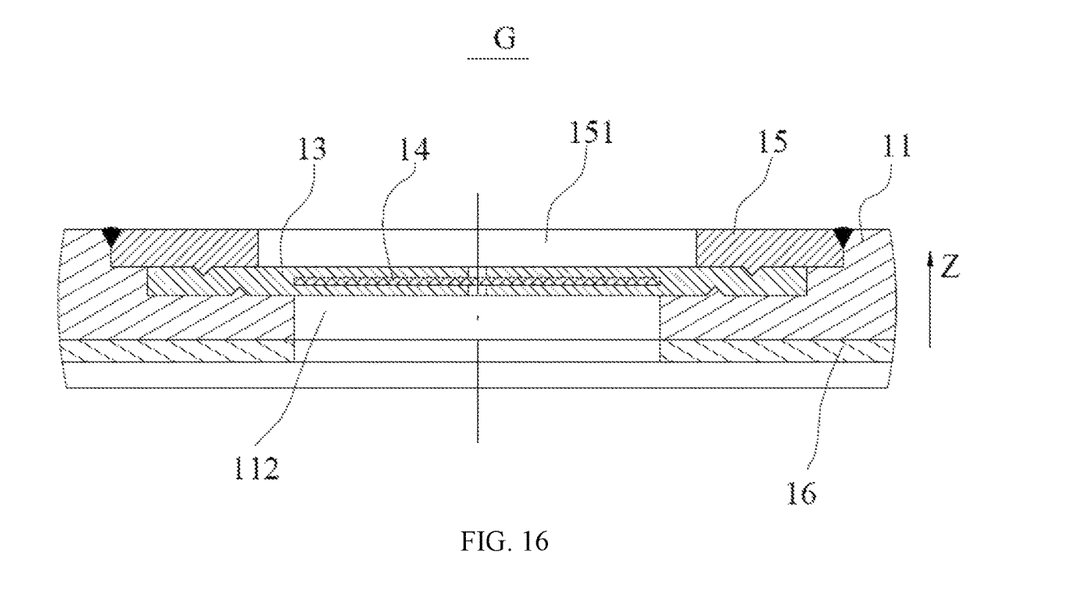
FIG. 16 is an enlarged view of an area G of FIG. 15.

FIG. 13 is an exploded view of a structure of a cover assembly of a secondary battery according to still another embodiment of the present disclosure. FIG. 14 is a front view of a cover assembly of a secondary battery according to still another embodiment of the present disclosure. FIG. 15 is a cross-sectional view taken along line F-F of FIG. 14. FIG. 16 is an enlarged view of an area G of FIG. 15.

In an implementation, the protective part 14 is at least partially disposed inside the gas exhaust valve 13. As shown in FIG. 16, the protective part 14 is integrally disposed inside the gas exhaust valve 13. Specifically, the protective part 14 and the gas exhaust valve 13 may be formed into one piece by injection molding, and the protective part 14 is directly fixed through the gas exhaust valve 13. In this way, a process of fixing the protective part 14 can be simplified and a space of the cover assembly 1 can be saved.

In an implementation, the protective part 14 completely covers the gas vent 112. Since the protective part 14 completely covers the gas vent 112, the anti-penetration performance is further improved. An outer diameter of the protective part 14 may be smaller than an outer diameter of the gas exhaust valve 13, as shown in FIG. 16. Of course, the outer diameter of the protective part 14 may also be equal to the outer diameter of the gas exhaust valve 13, as long as the protective part 14 can completely cover the gas vent 112 so as to prevent external moisture or gas from entering the case 2 through the gas vent 112 and also prevent the electrolyte inside the case 2 from escaping to the exterior of the case 2 through the gas vent 112.

In this embodiment, since the projection of the protective part 14 in the thickness direction (Z) of the cover assembly is within the projection of the center hole 151 of the pressing block 15 in the thickness direction (Z) of the cover assembly, when the gas exhaust valve 13 deforms in response to an increase in temperature, the gas inside the case 2 can blow the protective part 14 through the center hole 151 to the exterior of the case 2 without falling into the case 2, which would otherwise cause an internal short-circuit of the internal battery 100.

Another exemplary embodiment will be described in the following, in which elements that are the same as those in the above exemplary embodiments will not be further described herein, and only dissimilar elements will be described in detail.

Figure 17:
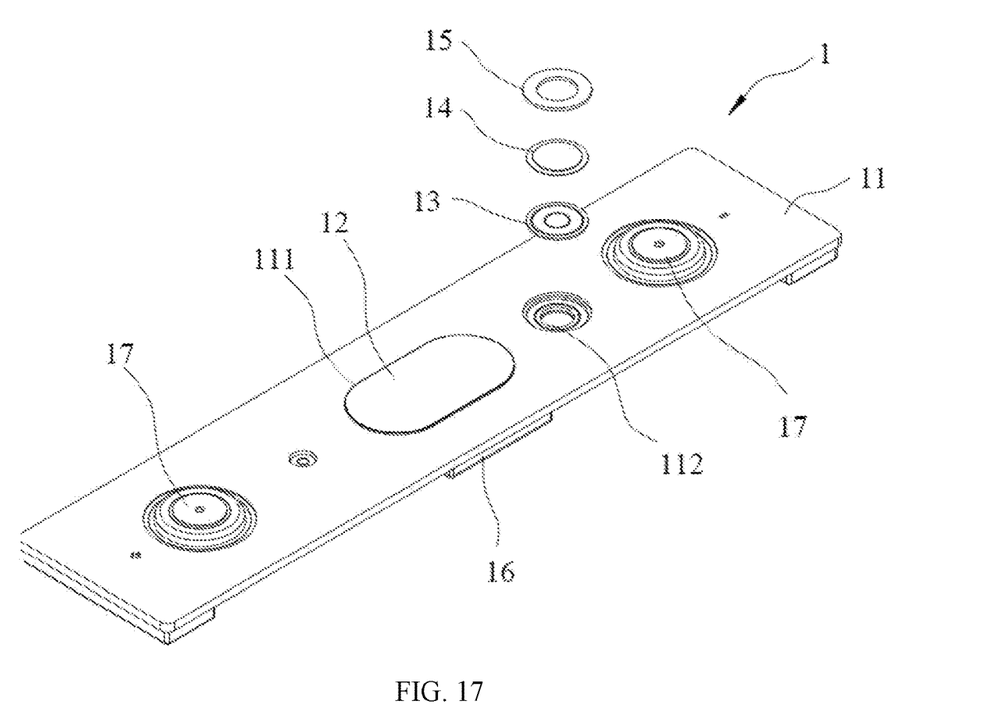
FIG. 17 is an exploded view of a structure of a cover assembly of a secondary battery according to yet another embodiment of the present disclosure.
Figure 18:
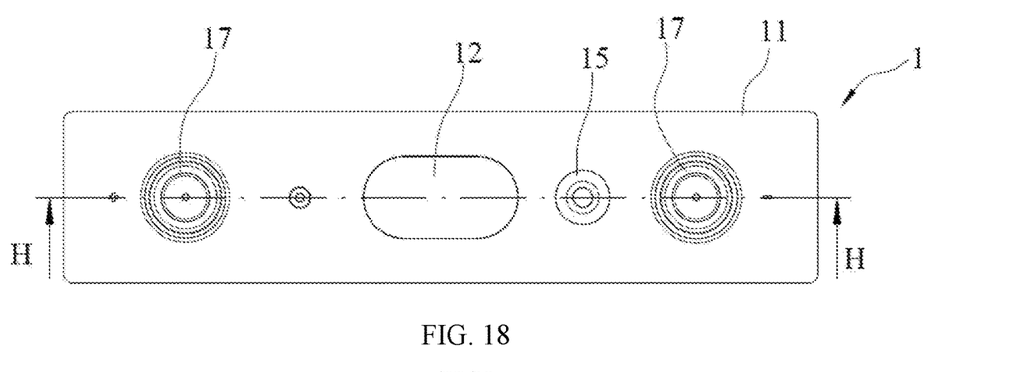
FIG. 18 is an front view of a cover assembly of a secondary battery according to yet another embodiment of the present disclosure.
Figure 19:
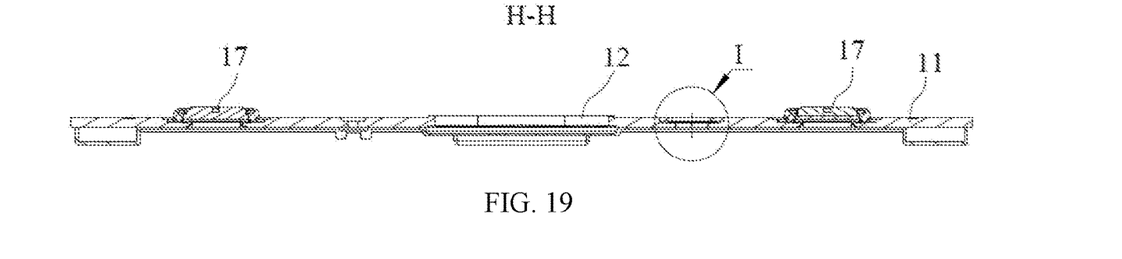
FIG. 19 is a cross-sectional view taken along line H-H of FIG. 18.
Figure 20:
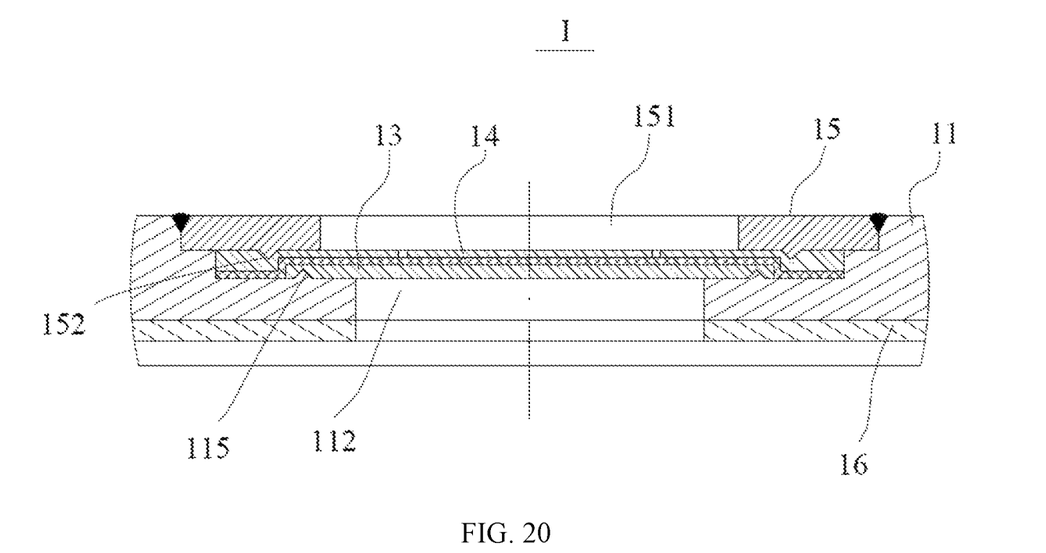
FIG. 20 is an enlarged view of an area I of FIG. 19.
Figure 21:
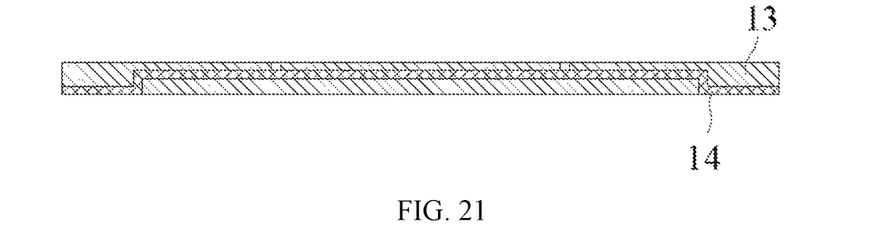
FIG. 21 is a schematic view of a structure in which a gas exhaust valve matches a protective part as shown in FIG. 20.
Figure 22:
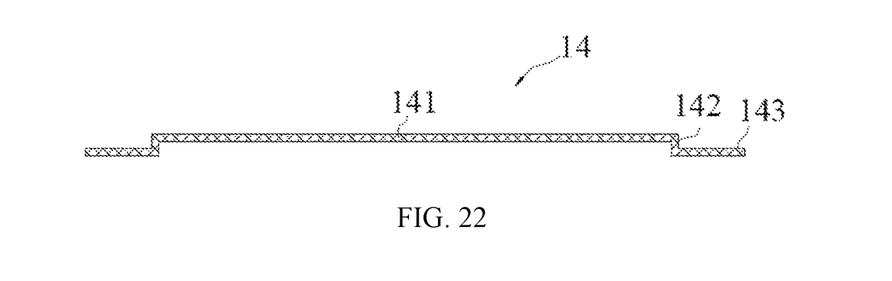
FIG. 22 is a cross-sectional view of a structure of a protective part as shown in FIG.
Figure 23:
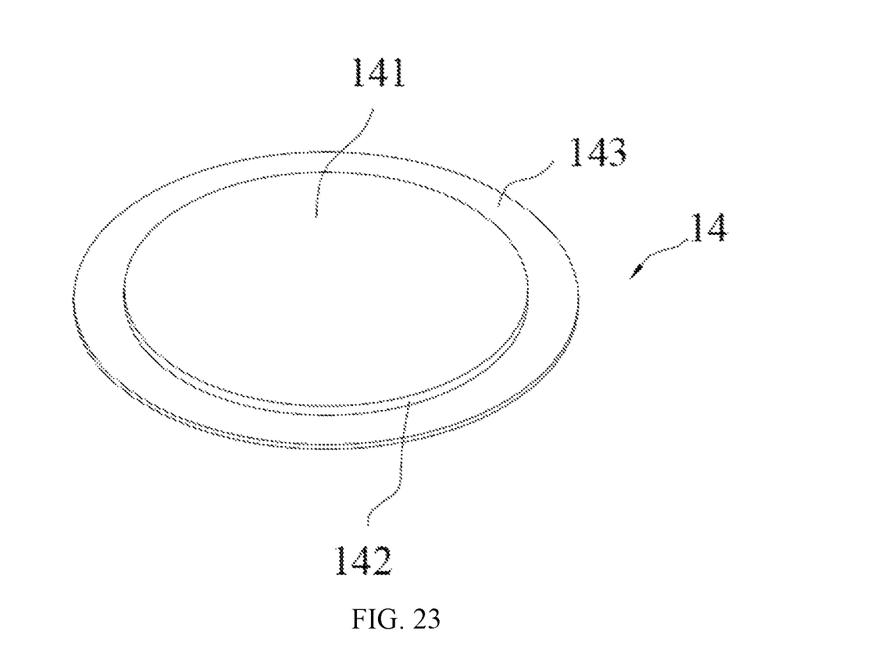
FIG. 23 is a perspective view of a structure of a protective part as shown in FIG. 17.

FIG. 17 is an exploded view of a structure of a cover assembly of a secondary battery according to yet another embodiment of the present disclosure. FIG. 18 is an front view of a cover assembly of a secondary battery according to yet another embodiment of the present disclosure. FIG. 19 is a cross-sectional view taken along line H-H of FIG. 18. FIG. 20 is an enlarged view of an area I of FIG. 19. FIG. 21 is a schematic view of a structure in which a gas exhaust valve matches a protective part as shown in FIG. 20. FIG. 22 is a cross-sectional view of a structure of a protective part as shown in FIG. 21. FIG. 23 is a perspective view of a structure of a protective part as shown in FIG. 17.

As shown in FIG. 23, in an implementation, the protective part 14 includes a main body 141, a connection portion 142, and an extension portion 143. The main body 141 is in a form of a flat plate, and the main body 141 completely covers the gas vent 112. The connection portion 142 is connected between the main body 141 and the extension portion 143 and is bent with respect to the main body 141. The extension portion 143 extends along a direction facing away from the gas vent 112.

In the structure of the protective part 14 described above, both an upper side and a lower side of the main body 141 are covered by the gas exhaust valve 13, and the bent connection portion 142 is also covered by the gas exhaust valve 13 both at a side close to the gas vent 112 and at a side facing away from the gas vent 112, so that the protective part 14 is covered by the gas exhaust valve 13 in all directions. In a normal operation of the secondary battery 100, the protective part 14 does not easily deform, thereby improving reliability of a connection between the gas exhaust valve 13 and the protective part 14. The extension portion 143 extends along the direction facing away from the gas vent 112, so that the entire protective part 14 can fully prevent gas or liquid from penetrating through the gas exhaust valve 13, thereby improving the anti-penetration performance.

With reference to FIG. 20, the first protrusion 115 is provided on the surface of the cover plate 11 facing the gas exhaust valve 13, and the first protrusion 115 presses against the gas exhaust valve 13; the second protrusion 152 is provided on the surface of the pressing protrusion 15 facing the gas exhaust valve 13, and the second protrusion 152 presses against the gas exhaust valve 13. The first protrusion 115 is located at a side of the connection portion 142 close to the gas vent 112; and the second protrusion 152 is located at a side of the connection portion 142 facing away from the gas vent 112.

The first protrusion 115 can improve the sealing between the gas exhaust valve 13 and the cover plate 11, and the second protrusion 152 can improve the sealing between the pressing block 15 and the gas exhaust valve 13. The protective part 14 extends to an edge of the gas exhaust valve 13, so that the anti-penetration performance can be improved.

Another exemplary embodiment will be described in the following, in which elements that are the same as those in the above exemplary embodiments will not be further described herein, and only dissimilar elements will be described in detail.

Figure 24:
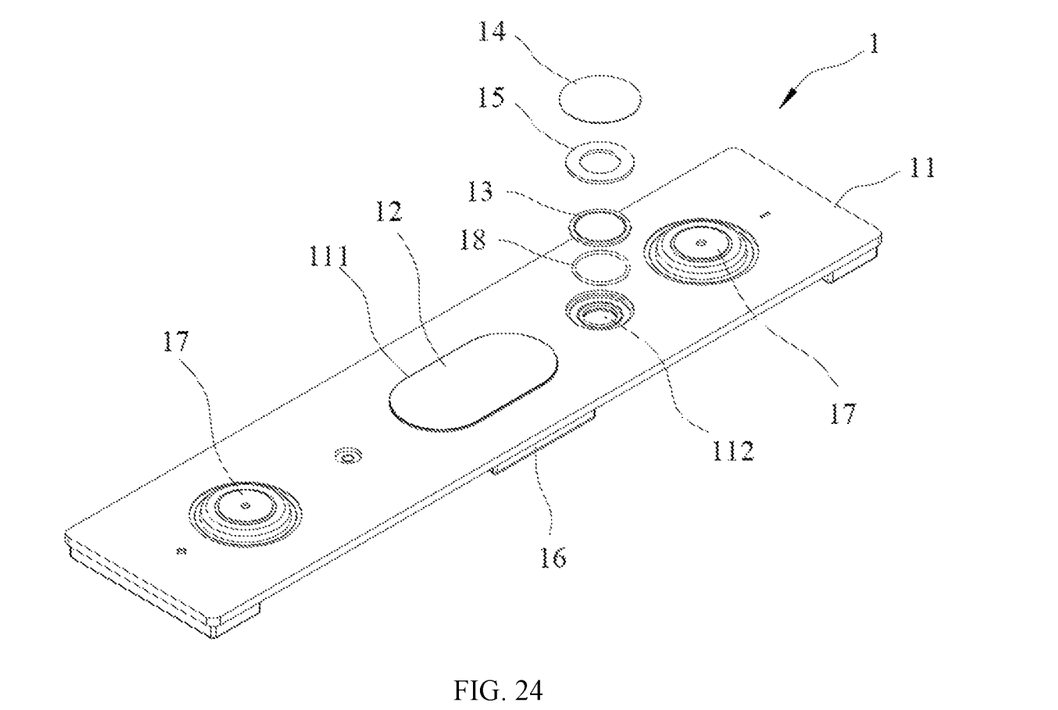
FIG. 24 is an exploded view of a structure of a cover assembly of a secondary battery according to yet another embodiment of the present disclosure.
Figure 25:
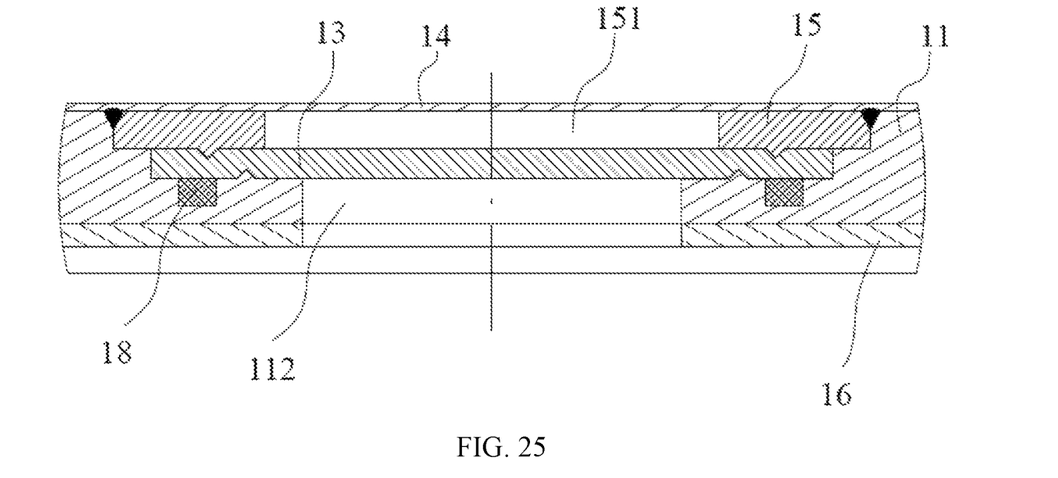
FIG. 25 is a cross-sectional view of a portion of a cover assembly of a secondary battery according to yet another embodiment of the present disclosure.

FIG. 24 is an exploded view of a structure of a cover assembly of a secondary battery according to yet another embodiment of the present disclosure. FIG. 25 is a cross-sectional view of a portion of a cover assembly of a secondary battery according to yet another embodiment of the present disclosure.

As shown in FIG. 24 and FIG. 25, in an implementation, a sealing part 18 surrounds the gas vent 112 for sealing a gap between the gas exhaust valve 13 and the cover plate 11, and the sealing part 18 is disposed between the gas exhaust valve 13 and the cover plate 11.

Since the sealing part 18 is disposed between the gas exhaust valve 13 and the cover plate 11 and surrounds the gas vent 112 for sealing the gap between the gas exhaust valve 13 and the cover plate 11, the sealing of the gas exhaust valve 13 is improved. This can prevent electrolyte leakage of the secondary battery 100 under a normal operation condition or prevent external water vapor from entering an interior of the case 2, which would otherwise reduce the safety performance and service life of the secondary battery 100.

Figure 26:
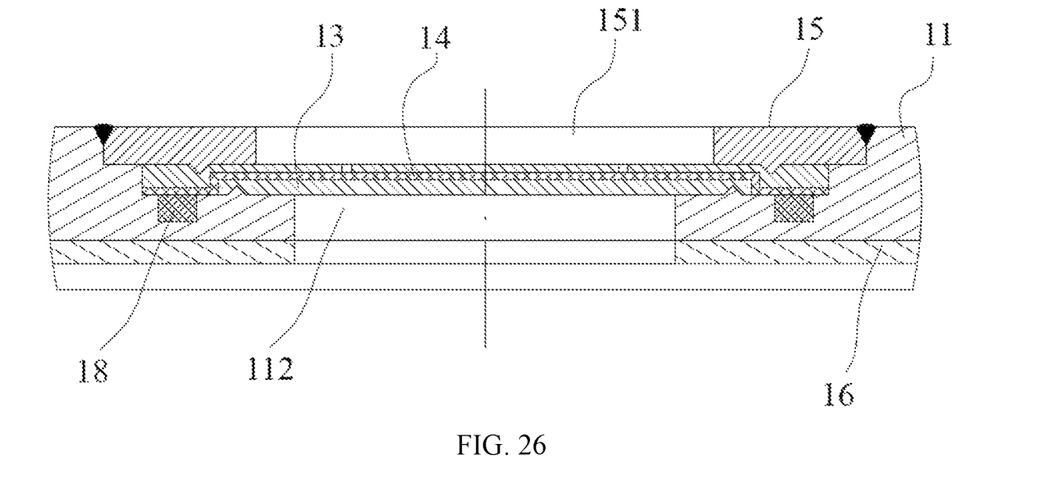
FIG. 26 is a cross-sectional view of a portion of a cover assembly of a secondary battery according to yet another embodiment of the present disclosure.

FIG. 26 is a cross-sectional view of a portion of a cover assembly of a secondary battery according to yet another embodiment of the present disclosure. As shown in FIG. 26, in an implementation, the sealing part 18 surrounds the gas vent 112 for sealing the gap between the protective part 14 and the cover plate 11, and the sealing part 18 is disposed between the protective part 14 and the cover plate 11.

Since the sealing part 18 is disposed between the protective part 14 and the cover plate 11 and surrounds the gas vent 112 for sealing the gap between the protective part 14 and the cover plate 11, the sealing of the protective part 14 is improved. This can prevent electrolyte leakage of the secondary battery 100 under a normal operation condition or prevent external water vapor from entering an interior of the case 2, which would otherwise reduce the safety performance and service life of the secondary battery 100.

The above-described embodiments are merely preferred embodiments of the present disclosure and are not intended to limit the present disclosure. Various changes and modifications can be made to the present disclosure by those skilled in the art. Any modifications, equivalent substitutions and improvements made within the principle of the present disclosure shall fall into the protection scope of the present disclosure.

What is claimed is:

1. A cover assembly of a secondary battery, comprising:
   a cover plate comprising a gas vent;
   a pressing block provided with a center hole opposite to the gas vent;
   a gas exhaust valve configured to seal the gas vent and create a thermal deformation in response to an increase in temperature to get out of a state of sealing the gas vent; and
   a protective part at least partially covering the gas vent and having a gas permeability coefficient smaller than a gas permeability coefficient of the gas exhaust valve,
   wherein a first protrusion is provided on a surface of the cover plate facing the gas exhaust valve, and the first protrusion presses against the gas exhaust valve; and the first protrusion is located at a side of a connection portion of the protective part close to the gas vent, and
   wherein a second protrusion is provided on a surface of the pressing block facing the gas exhaust valve, and the second protrusion presses against the gas exhaust valve; and the second protrusion is located at a side of the connection portion facing away from the gas vent.

2. The cover assembly according to claim 1, wherein the gas exhaust valve has a melting point within a range of 80° C. to 200° C., and the protective part is a metal sheet.

3. The cover assembly according to claim 1, wherein the protective part is at least partially disposed inside the gas exhaust valve.

4. The cover assembly according to claim 3, wherein the protective part completely covers the gas vent.

5. The cover assembly according to claim 1, wherein the protective part comprises a main body, the connection portion, and an extension portion;
   the main body is in a form of a flat plate, and the main body completely covers the gas vent;
   the connection portion is connected between the main body and the extension portion and is bent with respect to the main body; and
   the extension portion extends in a direction facing away from the gas vent.

6. The cover assembly according to claim 1, further comprising a sealing part surrounding the gas vent;
   wherein the sealing part is disposed between the gas exhaust valve and the cover plate for sealing a gap between the gas exhaust valve and the cover plate; or the sealing part is disposed between the protective part and the cover plate for sealing a gap between the protective part and the cover plate.

7. A secondary battery, comprising:
   a case comprising an opening;
   an electrode assembly received in the case; and
   a cover assembly, the cover assembly covering the opening of the case, wherein the cover assembly comprises:
   a cover plate comprising a gas vent;
   a gas exhaust valve configured to seal the gas vent, wherein when a temperature inside of the case exceeds a melting point, the gas exhaust valve is configured to melt to a state of unsealing the gas vent, thereby allowing gas inside of the secondary battery to exhaust through the melted gas exhaust valve;
   a protective part at least partially covering the gas vent and having a gas permeability coefficient smaller than a gas permeability coefficient of the gas exhaust valve to keep external moisture from entering the secondary battery, and to allow gas to exit the melted gas exhaust valve and the protective part,
   wherein the cover assembly further comprising a pressing block, the pressing block is provided with a center hole opposite to the gas vent, a first protrusion is provided on a surface of the cover plate facing the gas exhaust valve, and the first protrusion presses against the gas exhaust valve;
   wherein a second protrusion is provided on a surface of the pressing block facing the gas exhaust valve, the second protrusion presses against the gas exhaust valve, and the second protrusion is located at a side of a connection portion of the protective part facing away from the gas vent.

8. The secondary battery according to claim 7, wherein the melting point of the gas exhaust valve is within a range of 80° C. to 200° C., and the protective part is a metal sheet.

9. The secondary battery according to claim 7, wherein the protective part is at least partially disposed inside the gas exhaust valve.

10. The secondary battery according to claim 9, wherein the protective part completely covers the gas vent.

11. The secondary battery according to claim 7, wherein the protective part comprises a main body, the connection portion, and an extension portion;

the main body is in a form of a flat plate, and the main body completely covers the gas vent;
the connection portion is connected between the main body and the extension portion and is bent with respect to the main body; and
the extension portion extends in a direction facing away from the gas vent.

12. The secondary battery according to claim 7, wherein the cover assembly further comprises a sealing part surrounding the gas vent;
wherein the sealing part is disposed between the gas exhaust valve and the cover plate for sealing a gap between the gas exhaust valve and the cover plate; or the sealing part is disposed between the protective part and the cover plate for sealing a gap between the protective part and the cover plate.

13. A cover assembly of a secondary battery, comprising:
a cover plate comprising a gas vent;
a gas exhaust valve configured to seal the gas vent, wherein when a temperature inside of the secondary battery exceeds a melting point of 80° C., the gas exhaust valve is configured to melt to a state of unsealing the gas vent, thereby allowing gas inside of the secondary battery to exhaust through the melted gas exhaust valve; and
a protective part at least partially covering the gas vent and having a gas permeability coefficient smaller than a gas permeability coefficient of the gas exhaust valve to keep external moisture from entering the secondary battery, wherein the protective part is configured to allow the gas to exit the melted gas exhaust valve and the protective part,
wherein the cover assembly further comprising a pressing block, the pressing block is provided with a center hole opposite to the gas vent, a first protrusion is provided on a surface of the cover plate facing the gas exhaust valve, and the first protrusion presses against the gas exhaust valve;
wherein a second protrusion is provided on a surface of the pressing block facing the gas exhaust valve, the second protrusion presses against the gas exhaust valve, and the second protrusion is located at a side of a connection portion of the protective part facing away from the gas vent.

14. The cover assembly according to claim 13, wherein the protective part is disposed inside the gas exhaust valve in a thickness direction of the cover assembly.

\* \* \* \* \*